United States Patent [19]
Lichtenwalter et al.

[11] 3,714,259

[45] Jan. 30, 1973

[54] PRODUCTION OF LINEAR POLYETHYLENE POLYAMINES

[75] Inventors: Myrl Lichtenwalter; Thomas Howard, both of Austin, Tex.

[73] Assignee: Jefferson Chemical Company, Inc., Houston, Tex.

[22] Filed: Aug. 20, 1970

[21] Appl. No.: 65,735

[52] U.S. Cl........260/583 P, 260/268 SY, 260/584 R
[51] Int. Cl..............................................C07c 85/06
[58] Field of Search....................................260/583 P

[56] References Cited

UNITED STATES PATENTS 3,121,115  2/1964  Meuly..........................260/583 P X 3,383,417  5/1968  Lichtenwalter...............260/585 B X

OTHER PUBLICATIONS

Sidgwick, "The Organic Chemistry of Nitrogen," 1966, Clarendon Press–Oxford, page 115

*Primary Examiner*—Joseph P. Brust
*Attorney*—John R. Kirk, Jr., H. G. Jackson and Terrence Dean Dreyer

[57] ABSTRACT

A catalytic process is provided for discriminately producing linear polyethylene polyamines wherein linear products are obtained by reacting an ethyleneamine compound with an ethanolamine compound under select process conditions.

9 Claims, No Drawings

PRODUCTION OF LINEAR POLYETHYLENE POLYAMINES

This invention relates to a catalytic process for producing in high yields linear polyethylene polyamines, such as diethylenetriamine, and higher homologs, such as triethylenetetramine, tetraethylenepentamine, and the like.

Traditional methods commonly employed for producing the linear polyethylene polyamines are to react ethylene dichloride with ammonia or to react an alkylhalide with a diamine at elevated temperatures and pressures. These methods, although widely practiced, have serious disadvantages attendant thereto.

Exemplary shortcomings in these conventional processes include expensive and complicated procedures for recovering the desired poly(ethyleneamines). The hydrohalide salt is formed by these processes and the free amine is produced ky the action of caustic thereupon. The free amine and the metal halide thus formed are separated only with difficulty. An additional disadvantage is that the products produced by these conventional processes generally possess an undesirable color which can limit future applications where light colored materials are desired.

Now, in accordance with our invention, and in contrast to the foregoing conventional processes, a novel method has been discovered wherein salt-free linear polyethylene polyamines can be directly prepared. Our novel process eliminates the difficult procedure of separating the metal halide and the free amine, as well as eliminating the use of chlorine and caustic. Pollution problems associated with these materials are correspondingly eliminated. The poly(ethyleneamine) products obtained from our novel process are very light in color as contrasted to the dark colored poly(ethyleneamines) usually obtained by the conventional methods. Our novel process employs less expensive raw materials than the conventional processes and thus provides an economical method for directly producing pure linear polyethylene polyamines in excellent yields.

It has now been discovered that high quality yields of salt free linear polyethylene polyamines can be directly prepared by reacting (1) an ethyleneamine compound, such as ethylenediamine, or a polyethylene polyamine such as diethylenetriamine with (2) an ethanolamine compound in the presence of a hydrogenation catalyst, under select process conditions. The predilection for producing linear poly(ethyleneamines) according to our process, in contrast to the expected production of cyclic amines, such as piperazine, is assured by employing the process conditions and reactants of our invention.

Thus, in accordance with out invention, an ethyleneamine compound represented by the following formula:

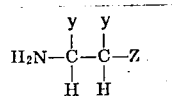

is reacted with an ethanolamine compound represented by the following formula:

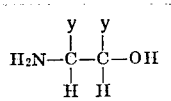

wherein y is hydrogen or $CH_3$, Z is $NH_2$ or

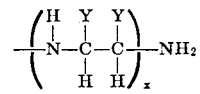

and x is an integer from 1 to 4.

Exemplary ethyleneamine compounds are ethylenediamine, diethylenetriamine, triethylenetetramine, tetraethylenepentamine, pentaethylenehexamine, and compounds including methyl substituents thereof such as 1-methyl-ethylenediamine, and the like. Exemplary ethanolamine compounds include ethanolamine, 1-methyl-ethanolamine, 1,2-dimethylethanolamine, and the like.

The linear polyethylene polyamines produced according to our process can correspondingly be represented by the following formula:

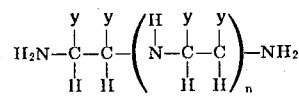

wherein y is hydrogen or $CH_3$ and n is an integer from 1 to 5. Exemplary compounds corresponding to the above formula include diethylenetriamine, triethylenetetramine, tetraethylenepentamine, pentaethylenehexamine, hexaethleneheptamine, and the like. The particular reactants of this invention, as hereinbefore described, are contacted in the presence of a hydrogenation catalyst at a temperature in the range of about 140° to 170°C., preferably 145° to 165°C. Our process is operated at pressures sufficient to maintain the reactants and products essentially in the liquid phase. Hydrogen pressures in the range of about 200 to 5,000 psig can be suitably employed. Mixtures of hydrogen with an inert gas such as nitrogen can also be employed.

Water in an amount from about 0 to about 100 wt. % of the reactants can be added to the reactor to provide accurate temperature control and for diluent effect if desired.

The essentially liquid reactants are sufficiently admixed such that the primary result is an intimate mixture of the components. The admixing of the ingredients can be accomplished by any desired method such as by agitating the materials or by passing a mixture of the ingredients through a reaction vessel, such as pipe or tubular coil, at a rate such as to cause a turbulent flow of the mixture therein.

Unlike conventional processes ammonia is not added nor employed as a reactant in our process. Further, the process conditions, as herein defined, are so maintained that evolution of ammonia during the reaction is essentially avoided. The reactants are contacted, as herein described, and the evolution of ammonia is thus essentially avoided.

The catalysts which can be employed in our invention are known as hydrogenation catalysts. Hydrogenation catalysts, as herein employed, can be defined as those catalysts that promote the addition of hydrogen to unsaturated carbon-to-carbon linkages. Exemplary catalysts comprise nickel, copper, iron, palladium, platinum, cobalt, chromium, rhodium, molybdenum, titanium, and the like.

The hydrogenation catalyst can be employed in any form desired such as in the finally divided state, in the form of oxides, salts, and the like, in combination with one or more promoters, such as with a material like bauxite, pumice or kieselguhr, and the like, as well as mixtures thereof.

A particularly effective group of catalysts are those derived from the oxides of chromium, copper, nickel or cobalt, having a composition calculated in mol percent on an oxide-free basis of 60 to 85 percent nickel or cobalt, 14 to 37 percent copper, and 1 to 5 percent chromium, with the preferred composition being 72 to 75 percent nickel, 20 to 25 percent copper and 1 to 3 percent chromium.

Our process can be conducted batchwise or continuously. If desired, one or more poly(ethyleneamines) products can be recycled back to the reaction vessel for further contacting with added ethanolamine compound to produce a higher molecular weight poly(ethyleneamine) product.

The reactants and hydrogenation catalysts can be contacted in any suitable reaction vessel such as a stirred autoclave, tube reactor, or the like. The reactants and catalysts are contacted in an amount and for a time such that the total weight of the reactants (ethanolamine compound and ethyleneamine compound) in grams, per milliliter of catalyst volume, per hour is an integer in the range of about 1 to 5, preferably about 1.75 to 3.75.

The mol ratios of the reactants employed can be very broad. The ethyleneamine compound can be employed in amounts such that in admixture with the ethanolamine compound represents about 30 to 70 mol percent, preferably about 40 to 60 mol percent, of the admixture. Correspondingly, the ethanolamine compound represents from about 70 30, preferably about 60 to 40 mol percent, of the admixture. Larger or smaller mol ratios can, of course, be employed but would be economically discouraging.

Under theoretically optimum procedures the mol ratios of the ethyleneamine compound and the ethanolamine compound would be about 1:1.

The high yields of linear polyethylene polyamines produced in accordance with our invention can be recovered and separated by any conventional methods such as distillation.

The linear poly(ethyleneamines) produced according to our process will account for about 50 weight percent and generally higher of the total reaction products formed as a result of our contacting step (based on a water-free basis). The linear polyethylene polyamines produced in accordance with our invention are presently in high demand. They are used for may application such as in the preparation of oil additives, textile chemicals, chelating agents, fungicides, detergents, and the like.

Illustrative of our ability to produce straight-chained poly(ethyleneamines) rather than the expected cyclic compounds, when employing these reaction components, and demonstrative to the foregoing discussion and description, and not to be interpreted as a limitation on the scope thereof or on the materials herein employed, the following examples are presented.

EXAMPLE I

A mixture containing 50.2 weight percent monoethanolamine, 24.8 weight percent ethylenediamine and the remainder water was pumped through a reactor in continuous flow at a space velocity of 1.0 (total weight of the reactants per milliliter of catalyst volume per hour) under hydrogen pressure. The reactor had been filled with a pelleted catalyst composition from the oxides of nickel, copper, and chromium comprising about 72 to 75 percent nickel, 20 to 25 percent copper and 1 to 3 percent chromium calculated in mol percent on an oxide-free basis. The reactor temperature was held at 150°C. with a hydrogen pressure of 2,700 psig. The contents of the reaction products formed as a result of the contacting step based on a weight percent of the reaction products produced are reported in Table I on a water-free basis.

TABLE I

| | |
|---|---|
| Diethylenetriamine | 52.2 wt. % |
| Aminoethylethanolamine | 26.6 wt. % |
| Piperazine | 17.7 wt. % |
| Triethylenetetramine | 3.3 wt. % |

The above example effectively demonstrates the predilection of our process for producing high yields of linear poly(ethyleneamines).

EXAMPLE II

Example I was essentially duplicated in this run except that the ratio of monoethanolamine to ethylenediamine in the feed was reduced to 1:1. Contents of the reaction product on a water-free weight percent basis of the total reaction products produced are reported in Table II.

TABLE II

| | |
|---|---|
| Diethylenetriamine | 66.2 wt. % |
| Aminoethylethanolamine | 16.2 wt. % |
| Piperazine | 14.8 wt. % |
| Triethylenetetramine | 2.7 wt. % |

EXAMPLE III

To a stirred autoclave was added 113 grams (1.85 mols) of monoethanolamine, 111 grams (1.85 mols) of ethylenediamine, 224 grams of water, and 35 grams of a catalyst as employed in Example I. The autoclave was pressured to 250 psig with hydrogen and heated to 160°C. for a period of 3 hours. The pressure reached 430 psig. Contents of the reaction products produced on a water-free weight percent basis are reported in Table III.

TABLE III

| | |
|---|---|
| Diethylenetriamine | 58 wt. % |
| Piperazine | 20.3 wt. % |
| Aminoethylethanolamine | 14.7 wt. % |
| Triethylenetetramine | 6.5 wt. % |

EXAMPLE IV

To a 1-liter autoclave was charged 79 grams (1.29 mols) of monoethanolamine, 133 grams (1.29 mols) of diethylenetriamine, 212 grams of water, and 35 grams of catalyst as employed in Example I. The autoclave was sealed and purged with hydrogen, then pressured to 250 psig hydrogen pressure. The mixture was heated to 160°C. and held at that temperature for 3.0 hours. The diethylenetriamine conversion in the feed was 42.4 wt. percent. The amount of yields of triethylenetetramine and piperazine were about equal.

In this run the conversion of the ethylenediamine in the feed was 24.5 percent while the yield of diethylenetriamine was 87 percent of theory basis ethylenediamine.

This example effectively demonstrates operation of our novel process in batch-wise production.

The preceding examples can be repeated with similar success by substituting the generically and specifically described reactants and conditions of this invention for those employed in the examples.

As will be evident to those skilled in the art, various modifications of this invention can be made or followed in light of this discussion and disclosure herein set forth without departing from the spirit or the scope thereof.

We claim:

1. A direct process for preparing salt-free poly(ethyleneamines) comprising contacting in the presence of hydrogen and a hydrogenation catalyst an ethylene-diamine compound represented by the following formula:

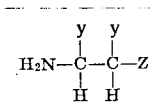

and an ethanolamine compound represented by the following formula:

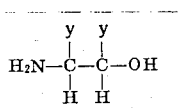

wherein y is hydrogen or CH₃ and Z is NH₂ or

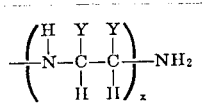

and x is an integer from 1 to 4 wherein said contacting is conducted in the essential absence of ammonia at a temperature in the range of about 140° to 170°C. and at pressures sufficient to maintain the reactants essentially in the liquid phase and wherein the total weight in grams of said ethanolamine compound and said ethylenediamine compound employed per milliliter of catalyst volume per hour is in the range of about 1 to 5 and wherein said ethanolamine compound and said ethylenediamine compound are employed in amounts such that in admixture the ethanolamine compound represents about 30 to 70 mol percent of said admixture.

2. The process according to claim 1 wherein said contacting is conducted at a temperature in the range of about 145° to 165°C. and wherein the total weight in grams of said ethanolamine compound and said ethylenediamine compound employed per milliliter of catalyst volume per hour is in the range of about 1.75 to 3.75.

3. The process according to claim 2 wherein said ethylenediamine compound is represented by the following formula:

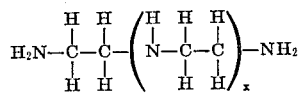

and x is an integer from 1 to 3.

4. The process according to claim 1 wherein said ethylenediamine compound is ethylenediamine or diethylenetriamine and said ethanolamine compound is monoethanolamine.

5. The process according to claim 4 wherein said ethylenediamine compound is ethylenediamine.

6. The process according to claim 5 wherein said hydrogenation catalyst comprises 72 to 75 mol percent nickel, 20 to 25 mol percent copper and 1 to 3 mol percent chromium.

7. The process according to claim 6 wherein the mol ratio of said ethylenediamine to said monoethanolamine is about 1:1.

8. The process according to claim 4 wherein said ethanolamine compound represents about 40 to 60 mol percent of said admixture.

9. The process according to claim 2 wherein said hydrogenation catalyst comprises 1 to 5 mol percent chromium, 14 to 37 mol percent copper and 60 to 85 mol percent nickel or cobalt.

* * * * *